G. T. Palmer.
Filter.
No. 73751. Patented Jan. 28, 1868.
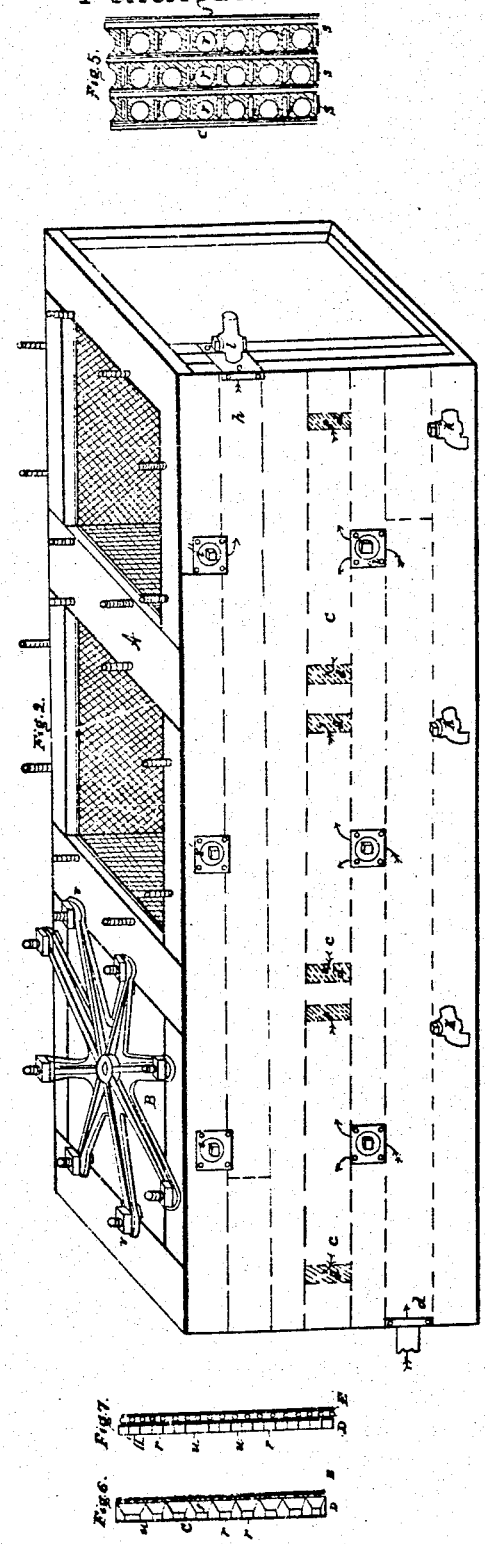
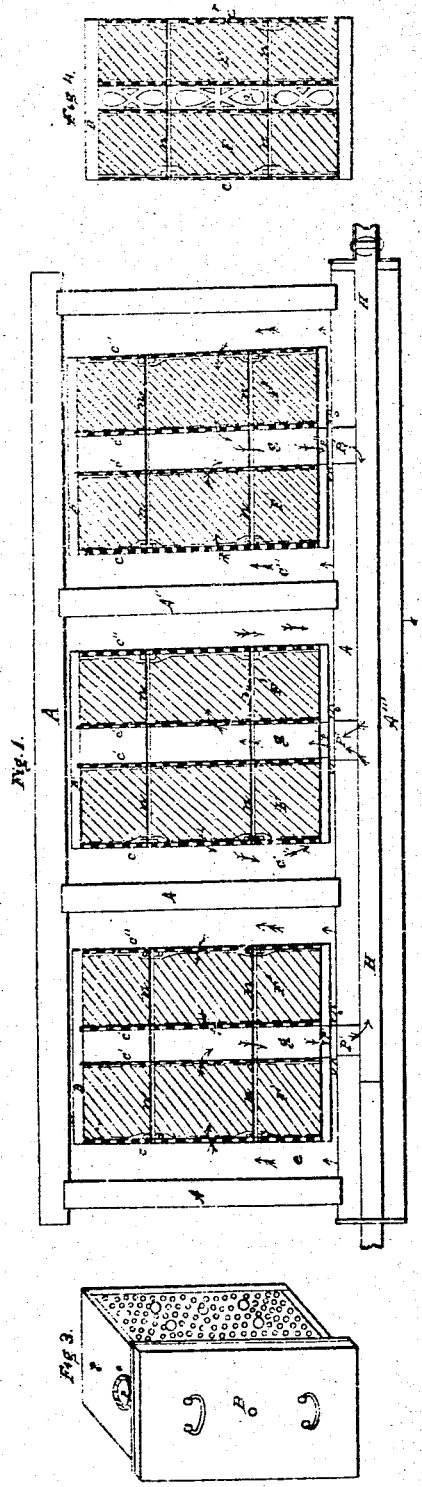

United States Patent Office.

GEORGE T. PALMER, OF BROOKLYN, NEW YORK.

Letters Patent No. 73,751, dated January 28, 1868; antedated January 16, 1868.

---

IMPROVEMENT IN FILTERS.

---

The Schedule referred to in these Letters Patent and making part of the same.

---

TO ALL WHOM IT MAY CONCERN:

Be it known that I, GEORGE T. PALMER, of Brooklyn, in the county of Kings, in the State of New York, have invented a new and useful Mode of Making Filters to filter liquids; and I do hereby declare that the following is a full and exact description thereof, reference being had to the accompanying drawings, and the letters of reference marked thereon. Similar letters in the different drawings represent like parts.

The nature and object of my invention are to make a compound filter, (and improve the parts thereof,) that will deliver a larger amount of filtered water than any filter now used, (the pressure of water, filtering-medium, and its thickness and area of surface being the same;) also to more effectually cleanse the separate filters, by reversing the current of water through a filter when it has become foul and requires cleansing, than can be done in the same space of time with any filter now in public use.

I will now proceed to describe the various parts of my improved filter.

Figure 1 is a horizontal section of my improved compound filter.

Figure 2 is a perspective view of the filter-chambers case.

Figure 3 is a perspective view of the outside of one of the filters.

Figure 4 is a vertical section of the filter, fig. 3.

Figure 5 is a part of one of the confining-plates, showing the inside face thereof.

Figure 6 is a cross-section of a confining-plate, coarse-wire (supporting) screen, and fine-wire (confining) screen.

Figure 7 is a cross-section of a perforated confining-plate, made in the manner now used, with my arrangement of a coarse-wire screen and fine-wire gauze, as shown in fig. 6.

In fig. 1, A A is the filter-chamber case; A' A' are partitions which divide the chambers; A''' is an outside wall to the water-channels; H H is a water-channel; $l$ is a stop-cock; $e$ $e'$ $e''$ are filter-chambers; B B' B'' are filters; $F^1$ $F^2$ is the filtering-material; $c$ $c'$ $c''$ are confining-plates, having perforations through them; $n$ $n$ are rods to secure the confining-plates $c$ $c'$ $c''$; $g$ is a chamber to receive the filtered water from the filtering-mediums $F^1$ $F^2$; $p$ is a port or passage for water between the chamber $g$ and channel H; $o$ is a rubber washer or neck, to join the chamber $g$ with the water-channel H.

In fig. 2, A is the filters'-containing case; B is a filter, secured in its water-chamber; $e'$ $e''$ are empty water-chambers; H, a channel for the delivery of filtered water; $a$, a channel for receiving the water to be filtered, and for conveying it to the chambers $e$ $e'$ $e''$; $d$ $d$ are openings to the filter-chambers $e$ $e'$ $e''$; $b$ $b'$ $b''$ are stop-cocks or valves to shut off the water from the filter-chambers $e$ $e'$ $e''$; $i$ $i'$ $i''$ are valves to close the water-passages from the chambers $g$ to the channel H; $k$ $k$ $k$ are cocks to draw off the water from the chambers $e$ $e'$ $e''$; $l$ is a stop-cock.

In fig. 3, $t$ is the filter-case; $o$ is a neck to connect the filter B and chamber $g$ with the channel H in fig. 1; $c$ is a perforated confining-plate.

In fig. 5, $c$ is a portion of the confining-plate $c$ in figs. 1 and 3; $r$ are perforations; $ffff$ are vertical ribs; $s$ $s$ $s$ are cross or horizontal ribs.

In fig. 6, $c$ is a perforated confining-plate; $f$ are ribs on the inside of the plate $c'$; D is a coarse-wire (supporting) screen, shown by the red color; E is a fine-wire (confining) screen, shown by the blue line; $r$ $r$ are perforations; $u$ $u$ are the blank spaces on the outside of the plate $c$, which are tapered off to a narrow edge on the inside of the plate, by the ribs $f$ and $s$, shown on fig. 5.

In fig. 7, H' is a perforated confining-plate, made in the usual manner; $r$ $r$ are perforations; $u$ $u$ are blank spaces between the perforations $r$ $r$; D is a coarse-wire supporting-screen, shown by the red color; E, a fine-wire confining-screen, shown by the blue line.

The object of the ribs $f$ and $s$ on the inside of the confining-plates, and shown on figs. 5 and 6, is to remove the filtering-medium $F^1$ $F^2$ to a sufficient distance from the blank spaces of the confining-plate $c$, to prevent a lodgment of the screened matter that would obstruct the free access of water to the surface of the filtering-medium $F^1$ $F^2$. The ribs $s$ $s$ $s$, shown on fig. 5, do not join the vertical ribs $fff$, the object of which is to leave channels between the cross and vertical ribs, and between the blank spaces of the plate $c$ and wire screens D and E, for the purpose of allowing the screened matter to settle down to the bottom of the filter-chambers $e$ $e'$ $e''$.

The object of the coarse-wire screen D is, first, to support the fine-wire gauze confining-screen E from sinking into the spaces between the ribs $f$ and $s$, or against the blank parts of the plate H; and second, to remove the fine-wire screen E more effectually from having its surface obstructed from the free action of the water to the whole of the surface, and the surface of the filtering-mediums $F^1$ and $F^2$. By the arrangement of the coarse and strong-wire screen, (the wire of which is round, and the surface uneven where the wires are locked together,) very small points are brought to support the fine-wire screen E, and the strong-wire screen allows of much larger spaces between the bearings of the confining-plates, and consequently allows of much larger holes in them, for the purpose of admitting the water to the filtering-medium, than could be used without the intermediate supporting-screen D.

I have shown my arrangement of the screens D and E, in fig. 7, as it would be found to be of great advantage when used in combination with an ordinary perforated confining-plate, but it would work much better in combination with the ribed plate, figs. 5 and 6.

The object of making the filters B B' B'' with outside surfaces of filtering-material, and an inside chamber to receive the filtered water, and a connecting neck, o, (as shown in fig. 1,) to pass the filtered water into the channel H, is this, that when the filter is placed in a closed vessel or containing-chamber, where there is a great pressure of water, it is much easier to make a tight joint of a small surface than of a large one. Leakage of the unfiltered water into the channel of the filtered water is thereby guarded against, and the facility of removing and replacing the filter is much greater than would be the case with any other arrangement of a removable filter.

The object of combining the filters B B' B'' in the manner shown, is to make a filter that the parts may be cleansed separately and alternately, (by removing the filtering-medium and replacing fresh material,) without stopping the flow of water; also to secure a copious flow of water for the purpose of cleansing any one of the separate filters when the current of water is reversed; and to make the parts of the filter easy and convenient to be handled and repacked, which is of great advantage in a large filter, suitable for a large paper-manufactory, where a large supply of water is required.

The object in making the filter-containing chamber-case in the manner shown, is to secure greater compactness of the parts than would be obtained if the chambers were made separately, and connected together with pipes to convey the water to and from the filter.

I will now describe the manner of working the filter: Water is passed through the pipe $a'$, fig. 2, into the channel $a$, whence it passes through the opened valves $b\ b'\ b''$, thence through the parts $d\ d$ into the filter-chambers $e\ e'\ e''$, thence through the perforated plates $c\ c''$, fig. 2, filtering-medium $F^1\ F^2$, plates $g'\ g'$, to the chambers $g\ g\ g$, whence the filtered water passes through the passages $p\ p'\ p''$ to the water-channel H, from which it is discharged at $l$, as shown by the arrows in fig. 2, and in the chambers $e$ and $e''$, and filters B and B'', fig. 1. The black arrows represent unfiltered water and the red ones filtered water.

To cleanse the filter $B^1$, shown in fig. 1, by reversing the current of water through it, close the valve $b'$, shown in fig. 2, after which open the waste-cock $k'$, and then close the stop-cock $l$. The course of the water will then be into the filter-containing chambers $e$ and $e''$, thence through the filters B B'', ports $p\ p''$, and into the chamber $g'$, and through the filtering-material $F^1\ F^2$ of filter B', into the containing-chamber $e'$, whence it passes off through the cock $k'$, shown in fig. 2.

The course of the water in cleansing the filter B', is shown by the black and red arrows in fig. 1. The whole of the water that has passed through the filters B B'', is made to pass through the filter B', cleansing both sides of the filter at the same time. If it is desired to have a portion of the filtered water for use, the stop-cock $l$ may be only partly closed, and a part of the water drawn off through the delivery-pipe, and the other portion passed through the filter which is being cleansed, as shown.

To change the filtering-material $F^1\ F^2$, close the valves $b$ and $i$, and open the cock $k$ of the chamber containing the filter to be cleansed and repacked, after which remove the fastenings $v\ v$, and take the filter from its chamber, when the confining-plates and screens can be removed and the filtering-material removed, and then the filter can be repacked, replaced, and set to work. A more expeditious way would be to have duplicate filters ready packed with clean filtering-material, so that after removing the unclean filter, it can immediately be replaced by a clean one, and again set to work with but little loss of time. The other filters may be kept at work undisturbed while the one is being changed.

The form of the filters B B' B'' may be changed, and at the same time preserve the parts substantially the same.

Any suitable filtering-material or materials may be used, that are best suited for the purpose required, and any number of filters may be conjoined in the manner shown. By this arrangement of the filters, and their parts and connections, the filters can be worked separately or conjointly, and be made to cleanse each other most effectually, by reversing the current through them, as shown.

Having thus described my improved filter, I claim—

1. The combination and arrangement of the filters B B' B'', water-channels H and $a$, valves $i\ i'\ i''$ and $b\ b'\ b''$, and stop-cocks $k\ k'\ k''$ and $l$, in manner substantially as shown and for the purpose set forth.

2. The removable filter B, having an inside water-chamber $g$, provided with a neck or pipe, $o$, all constructed substantially as shown.

3. The ribs $f$ and $s$, on the inside of the perforated plates $c\ c$, arranged in relation to each other substantially as set forth and for the purpose specified.

4. The arrangement and combination of the coarse-wire supporting-screen D with the perforated plates $c\ c$, fine-wire confining-screen E, and filtering-medium F, as and for the purpose shown and described.

5. A filter-containing chest having casing A A, partitions A' A'', water-channels H and $a$, valves $b\ b'\ b''$ and $i\ i'\ i''$, and cocks $k\ k'\ k''$, arranged substantially in the manner shown.

GEO. T. PALMER.

Witnesses:
GEORGE A. NOLEN,
EDWIN J. McLAIN.